United States Patent [19]

Idesawa et al.

[11] Patent Number: 5,259,484
[45] Date of Patent: Nov. 9, 1993

[54] REACTION FORCE TYPE DISC BRAKE

[75] Inventors: Isao Idesawa; Hideyuki Terashima, both of Nagano, Japan

[73] Assignee: Nissin Kogyo Co., Ltd., Nagano, Japan

[21] Appl. No.: 29,939

[22] Filed: Mar. 10, 1993

Related U.S. Application Data

[63] Continuation of Ser. No. 788,647, Nov. 6, 1991, abandoned.

[30] Foreign Application Priority Data

Feb. 15, 1991 [JP] Japan ............................ 3-006344[U]

[51] Int. Cl.⁵ .............................................. F16D 65/20
[52] U.S. Cl. .................................. 188/73.45; 188/73.39
[58] Field of Search ............... 188/73.45, 73.44, 73.39, 188/73.32, 72.4, 71.1, 73.47

[56] References Cited

U.S. PATENT DOCUMENTS

| | | |
|---|---|---|
| 3,688,876 | 9/1972 | Hirai et al. |
| 4,775,034 | 10/1988 | Pachner et al. |
| 4,784,243 | 11/1988 | Méry |
| 4,865,161 | 9/1989 | Schneider et al. ............ 188/73.45 X |

FOREIGN PATENT DOCUMENTS

| | | | |
|---|---|---|---|
| 2320463 | 3/1977 | France | 188/73.45 |
| 2506413 | 11/1982 | France | 188/71.1 |
| 49-120081 | 11/1974 | Japan | |
| 50-126886 | 10/1975 | Japan | |
| 56-76733 | 6/1981 | Japan | |
| 149629 | 9/1982 | Japan | 188/73.45 |
| 59-23871 | 7/1984 | Japan | |
| 35122 | 2/1987 | Japan | 188/72.4 |
| 1-80833 | 5/1989 | Japan | |
| WO91/05176 | 4/1991 | PCT Int'l Appl. | |
| 2233411A | 1/1991 | United Kingdom | |

Primary Examiner—George E. Halvosa
Attorney, Agent, or Firm—Armstrong, Westerman, Hattori, McLeland & Naughton

[57] ABSTRACT

A reaction force type disk brake in which a bridge of a brake caliper is provided with a window opening through which friction pads can be inserted and withdrawn and the brake caliper is divided at the bridge into two blocks which are integrally interconnected by pairs of first and second connecting bolts provided on both sides of the window opening. The connecting bolts are arranged along an outer peripheral surface of said brake disk, and a relationship $L_1 < L_2$ is established wherein $L_1$ represents a distance between both the first connecting bolts and $L_2$ represents a distance between both the second connecting bolts and also a relationship $H_1 < H_2$ is established wherein $H_1$ represents a distance from a line intersecting a radius line of the brake disk at right angles at a center of a total urging force of the piston to the first connecting bolt and $H_2$ represents a distance from such line to the second connecting bolt. Rigidity of the brake caliper formed of two blocks can effectively be enhanced.

3 Claims, 6 Drawing Sheets

REACTION FORCE TYPE DISC BRAKE

This application is a continuation of application Ser. No. 07/788,647 filed Nov. 6, 1991, abandoned.

BACKGROUND OF THE INVENTION

1. Field of the Invention

The field of the present invention is reaction force type disk brakes for use in an automobile, a motorcycle and the like, and more particularly, improvements of reaction force type disk brakes comprising: a pair of friction pads disposed in an opposed relation to opposite faces of a brake disk; a brake caliper which includes first and second arms opposed to each other with the friction pads, interposed therebetween, a bridge integrally interconnecting the arms, and a piston received in a hydraulic cylinder formed in the first arm for urging a back of one of the friction pads; a stationary bracket having a torque receiving surface portion on which opposite ends of each friction pad are carried; and a pair of slide pins connecting the brake caliper to the bracket for sliding movement in an axial direction of the brake disk, the bridge being provided with a window opening through which the friction pads can be inserted and withdrawn, the brake caliper being divided, at the bridge, into a first block closer to the first arm and a second block closer to the second arm, the two blocks being integrally interconnected by bolt means.

2. Description of the Prior Art

Such a disk brake is already known, as disclosed, for example, in Japanese Utility Model Application Laid-open No. 80833/89.

In such, prior art disk brake, since the brake caliper is divided into the two blocks, the hydraulic cylinder which receives the piston therein is easily formed in the first arm without any interference by the second arm. On the other hand, however, it is difficult in this structure to insure a rigidity of the brake caliper, and a large window opening in the bridge further intensifies the difficulty.

SUMMARY OF THE INVENTION

Accordingly, it is an object of the present invention to provide a disk brake of the type described above wherein a brake caliper divided into two blocks can be effectively increased in rigidity.

To achieve the above object, according to the present invention, there is provided a reaction force type disk brake comprising: a pair of friction pads disposed in an opposed relation to opposite faces of a brake disk; a brake caliper including first and second arms opposed with the friction pads interposed therebetween, a bridge integrally interconnecting the arms, and a piston received in a hydraulic cylinder formed in the first arm for urging a back of one of the friction pads; a stationary bracket having a torque receiving surface portion on which opposite ends of each friction pad are carried; and a pair of slide pins connecting the brake caliper to the bracket for sliding movement in an axial direction of the brake disk, the bridge being provided with a window opening through which the friction pads can be inserted and withdrawn, the brake caliper being divided at the bridge into a first block closer to the first arm and a second block closer to the second arm, wherein the first and second blocks of the brake caliper are integrally interconnected by a pair of first connecting bolts and a pair of second connecting bolts arranged in a row on opposite sides of the window opening, all of the first and second connecting bolts being arranged along an outer peripheral surface of the brake disk, such that a relationship $L_1 < L_2$ is satisfied wherein $L_1$ represents a distance between both the first connecting bolts and $L_2$ represents a distance between both the second connecting bolts and such that a relationship $H_1 < H_2$ is satisfied wherein $H_1$ represents a distance from a line intersecting a radius line of the brake disk at right angles at a center of a total urging force of the piston to the first connecting bolt and $H_2$ represents a distance from the line to the second connecting bolt.

With the above feature of the present invention, it is possible to allot tensile and flexing or bending stresses to the first and second connecting bolts at different rates, thereby providing an equalization of stress. Therefore, it is possible to effectively increase the rigidity of the brake caliper by cooperation of the first and second connecting bolts. Moreover, both the connecting bolts are disposed as close to the brake disk as possible, which can contribute to making the brake caliper compact.

The above and other objects, features and advantages of the invention will become apparent from the following description of the preferred embodiment, taken in conjunction with the accompanying drawings.

BRIEF DESCRIPTION OF THE DRAWINGS

The drawings illustrate a preferred embodiment of the present invention, wherein.

DESCRIPTION OF THE PREFERRED EMBODIMENT

The present invention will now be described by way of a preferred embodiment applied to a disk brake for an automobile in connection with the accompanying drawings.

Figure 1:
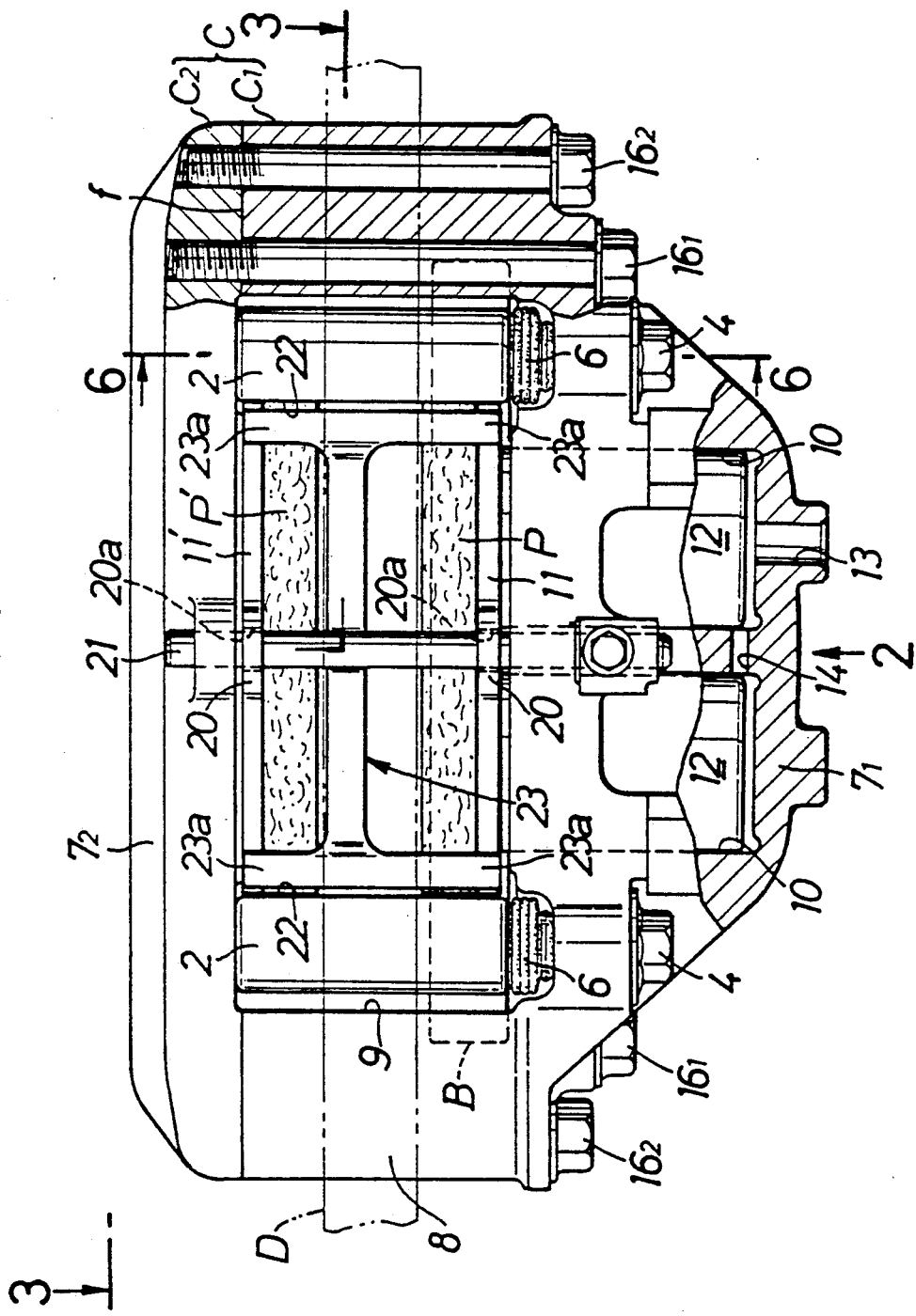
FIG. 1 is a partially longitudinal sectional plan view of a disk brake for an automobile.
Figure 2:
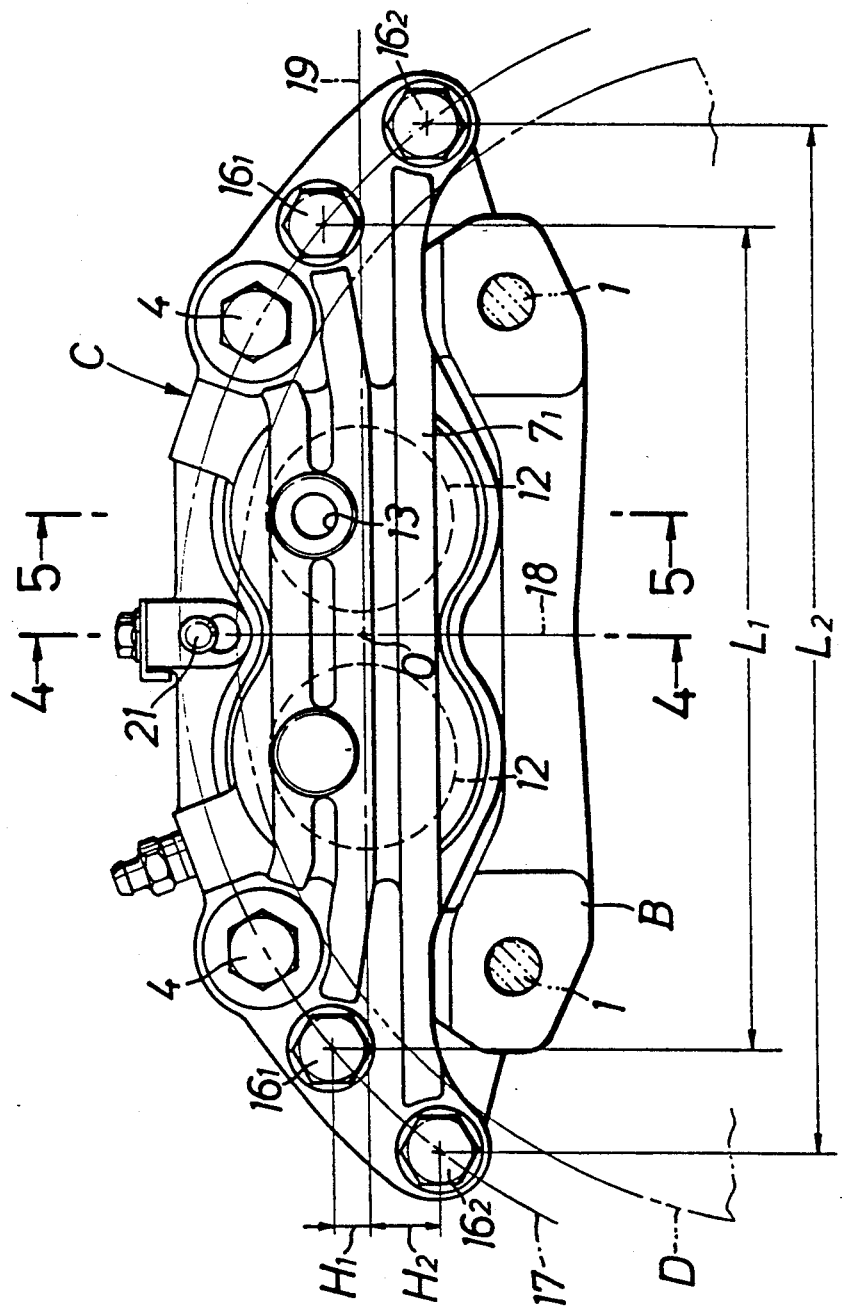
FIG. 2 is a view taken along an arrow 2 in FIG. 1.
Figure 3:
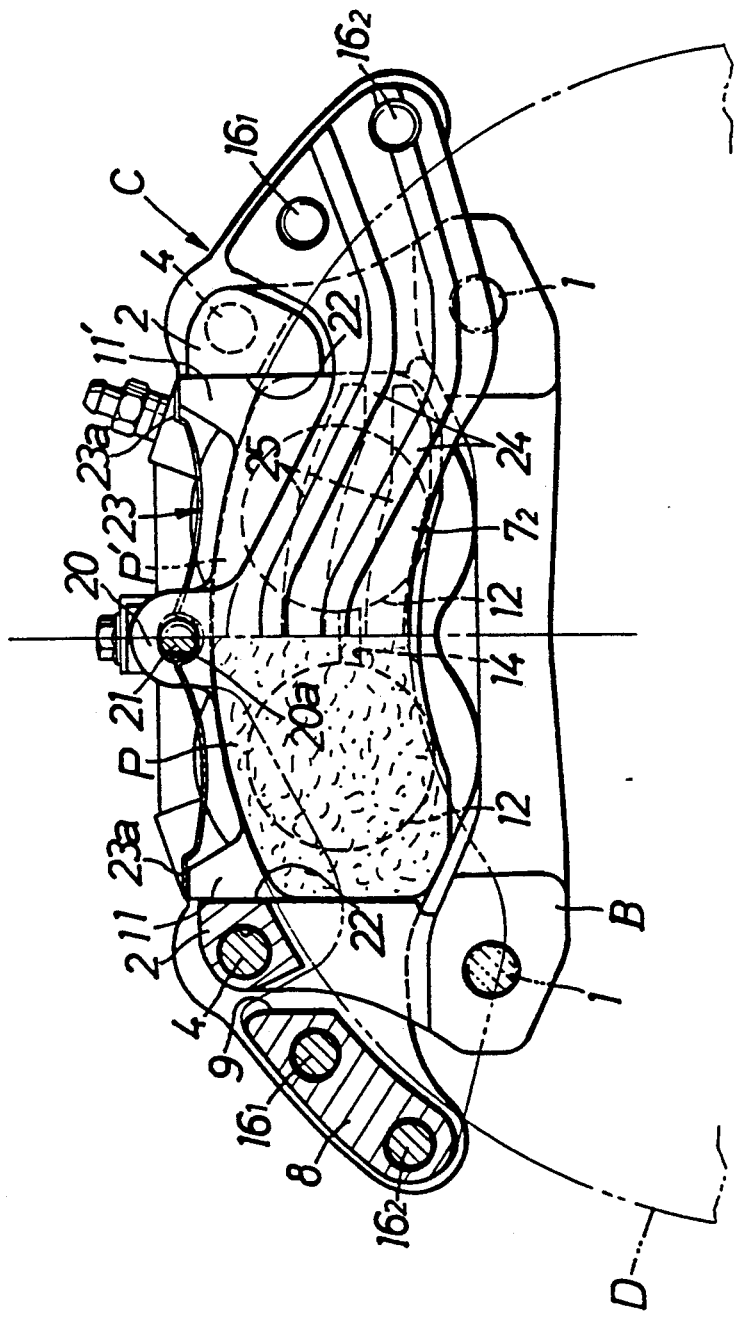
FIG. 3 is a sectional view taken along a line 3—3 in FIG. 1.
Figure 6:
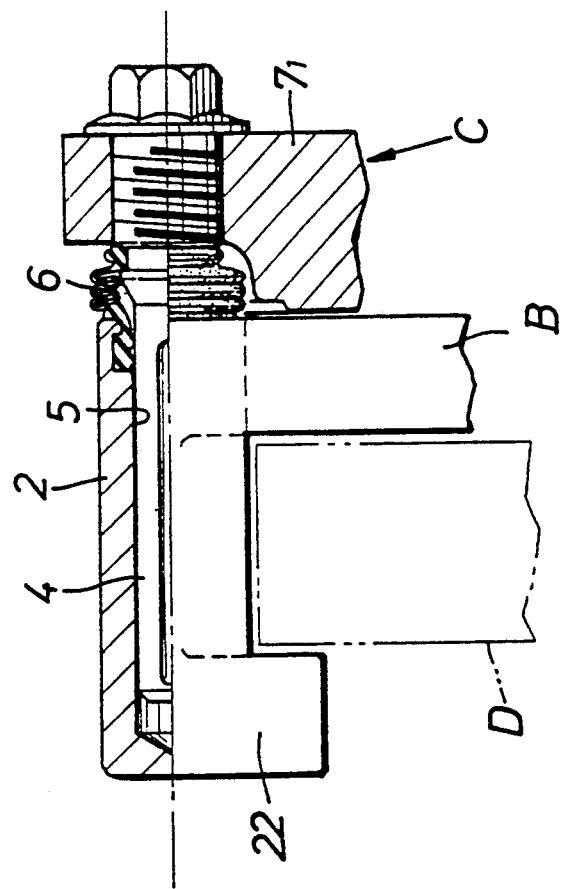
FIG. 6 is a sectional view taken along a line 6—6 in FIG. 1.

Referring to FIGS. 1 to 3, a bracket B is disposed adjacently on one face side of a brake disk D which is rotatable with a wheel of an automobile. The bracket B is secured to a knuckle (not shown) of the automobile by bolts 1 and is provided with a pair of reversed U-shaped portions 2, 2 (see FIG. 6). The portions 2, 2 are extended astride the brake disk D and are spaced apart from each other in a circumferential direction of the brake disk D.

A brake caliper C is connected to the bracket B at the reversed U-shaped portions 2, 2 through a pair of slide pins 4, 4. More specifically, the slide pins 4, 4 are screwed into the brake caliper C and slidably received in bottomed support holes 5, 5 provided in top portions of the reversed U-shaped portions 2, 2, respectively. A portion of each slide pin 4 exposed to the outside from the support hole 5 is covered with an expansible and contractable dust-proof boot 6.

The brake caliper C is comprised of first and second arms $7_1$ and $7_2$ opposed to opposite faces of the brake disk D with friction pads P and P' interposed therebetween bridge 8 extends astride the brake disk D to integrally interconnect both the arms $7_1$ and $7_2$. The bridge 8 is provided with a window opening 9 to which the bracket B and both the friction pads P and P' face. The window opening 9 is directed forwardly of a vehicle when the bracket B is attached to the knuckle. Therefore, during travelling of the automobile, airstream enters the window opening 9 to effectively cool the friction pads P and P' and the brake disk D.

Figure 5:
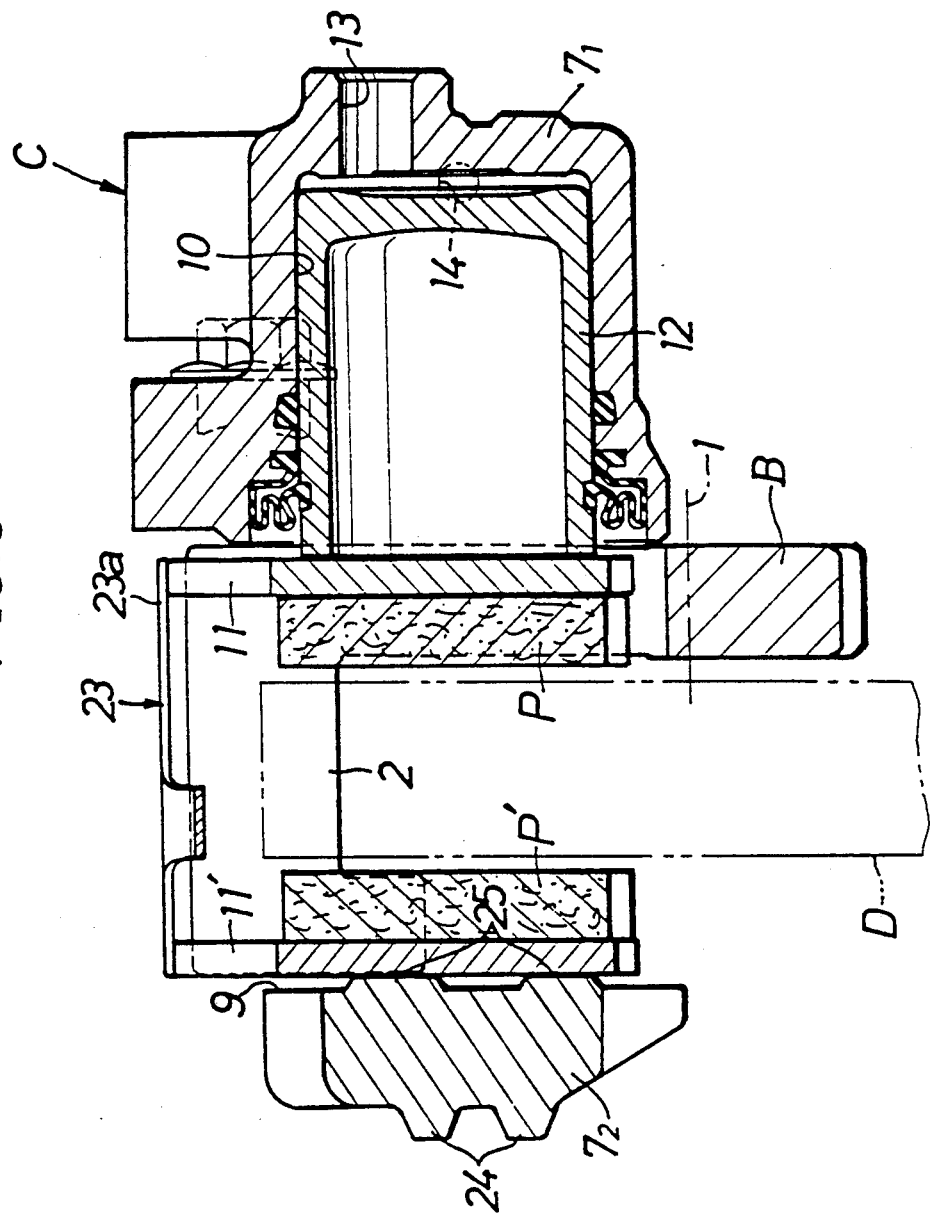
FIG. 5 is an enlarged sectional view taken along a line 5—5 in FIG. 2.

As shown in FIGS. 1 and 5, the first arm $7_1$ of the brake caliper C is provided with a plurality of, e.g., a pair of hydraulic cylinders 10, 10 arranged in a row in the circumferential direction of the brake disk D. Pistons 12, 12 are slidably received in the cylinders 10, 10, respectively. The pistons 12, 12 are capable of urging a backing metal 11 of one of the friction pads P. One of the hydraulic cylinders 10 is provided with a hydraulic pressure inlet port 13 through which a hydraulic pressure is introduced from a known master cylinder. And a through hole 14 is provided between the hydraulic cylinders 10, 10 to permit the communication therebetween. Thus, when the master cylinder is operated, both the hydraulic cylinders can be simultaneously increased in pressure by the output hydraulic pressure from the master cylinder, thereby urging both the pistons 12, 12 against the one friction pad P. A center of a total urging force in this operation is indicated by 0 in FIG. 2.

As shown in FIG. 1, the brake caliper C is divided into two blocks with a divided surface f parallel to a face of the brake disk D at the bridge 8, e.g., at a point close to the second arm $7_2$ in the illustrated embodiment. Herein, one of the blocks which is closer to the first arm $7_1$ is referred to as a first clock $C_1$, and the other block closer to the second arm $7_2$ is referred to as a second block $C_2$.

The first and second blocks $C_1$ and $C_2$ are secured to each other by pairs of first and second connecting bolts $16_1$, $16_1$; $16_2$, $16_2$ which are arranged in a row in parallel with the slide pins 4, 4 on both sides of the window opening 9.

In this case, as shown in FIG. 2, the slide pins 4, 4 and the first and second connecting bolts $16_1$, $16_1$; $16_2$, $16_2$ are arranged along an outer peripheral surface of the brake disk D, desirably on a circle 17 concentric with the brake disk D, so that the following expressions (1) and (2) are simultaneously established:

$$L_1 < L_2 \quad (1)$$

$$H_1 < H_2 \quad (2)$$

wherein
$L_1$ represents a distance between both the first connecting bolts $16_1$ and $16_1$;
$L_2$ represents a distance between both the second connecting bolts $16_2$ and $16_2$;
$H_1$ represents a distance from the first connecting bolt $16_1$ to a line 19 interseting a radius line of the brake disk D at right angles at the center 0 of the total urging force of the pistons 12, 12; and
$H_2$ represents a distance from the line 19 to the second connecting bolt $16_2$.

Figure 4:
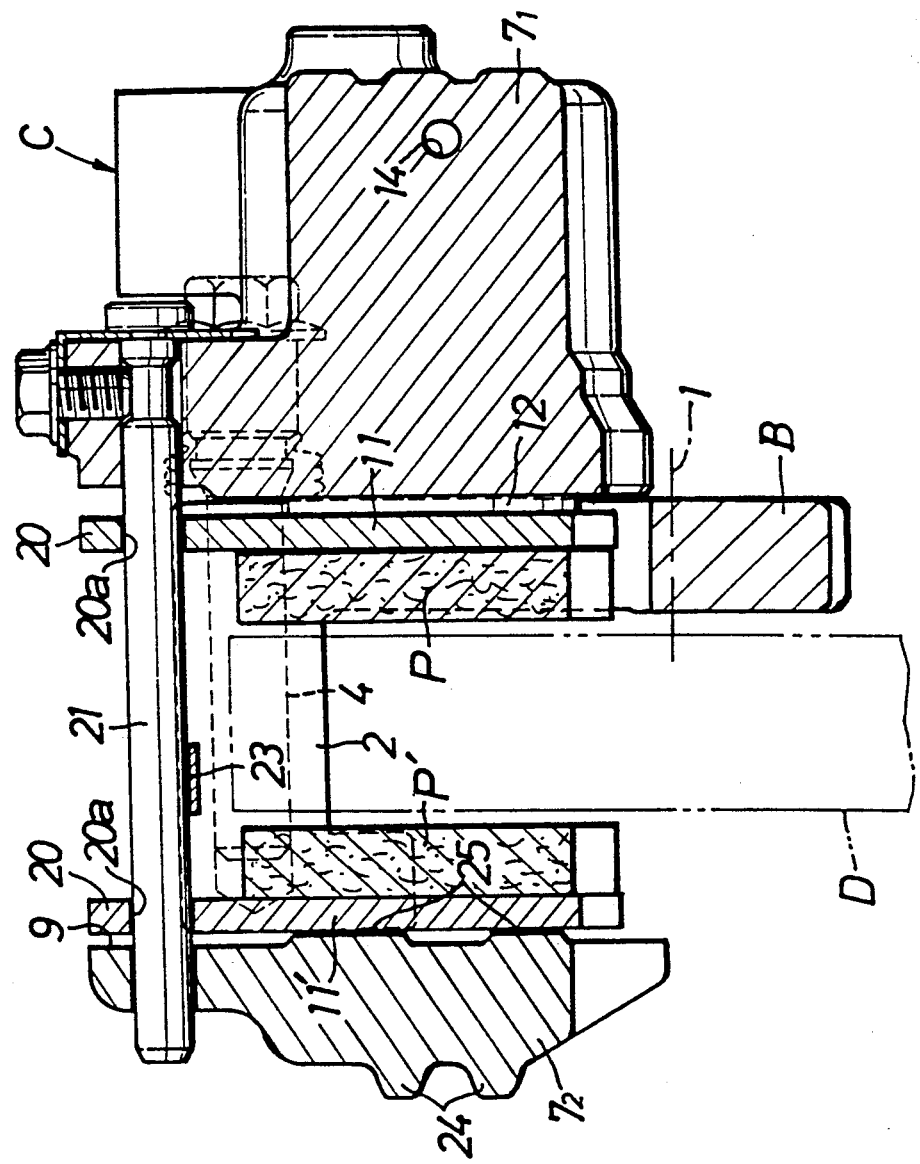
FIG. 4 is an enlarged sectional view taken along a line 4—4 in FIG. 2.

As shown in FIGS. 1 and 4, each of the backing metals 11, 11' of the friction pads P and P' is integrally formed with a mounting angle portion 20 having a pin hole 20a and projecting into the window opening 9. A hanger pin 21 is detachably mounted on both the arms $7_1$ and $7_2$ of the brake caliper C so as to extend across the window opening 9. The hanger pin 21 passes through the pin hole 20a so as to support the friction pads P and P'. The backing metals 11 and 11' of the friction pads P and P' are slidably carried at their opposite ends on torque receiving surfaces 22, 22 formed on the reversed U-shaped portions 2, 2 of the bracket B, respectively.

In order to inhibit any needless movement of the friction pads P and P', four resilient legs 23a—of an H-shaped pad spring 23 retained to the hanger pin 21 are carried and urged under pressure on upper surfaces of the backing metals 11 and 11' of the friction pads P and P'.

In the brake caliper C, as shown in FIGS. 3 to 5, a plurality of corrugated reinforcing ribs are formed bulged on an outer surface of the second arm $7_2$ to extend circumferentially of the brake disk D. A plurality of arcuate urging ribs 25, 25 are also formed bulged on an inner surface of the second arm $7_2$ to extend circumferentially of the brake disk D and to abut against a back of the friction pad P'.

The operation of this embodiment will now be described.

If the master cylinder (not shown) is operated by operation of a brake pedal, a hydraulic pressure is supplied to the hydraulic cylinders 10, 10 through the hydraulic pressure inlet port 13. Both the pistons 12, 12 are thereby advanced to urge the back of the one friction pad P, allowing the friction pad P to slide on the hanger pin 21 and the torque receiving surfaces 22, 22. The friction pad P is brought into close contact with one face of the brake disk D. Then, the reaction caused by such urging causes the brake caliper C to move in an opposite direction to the advancing movement of the pistons 12, 12 while causing the first and second slide pins 4, 4 to slide in the support holes 5, 5, respectively, thereby urging the back of the other friction pad P' by the second arm $7_2$ into close contact with the other face of the brake disk D. This allows a braking force to be applied to the brake disk D which is rotated with the wheel.

During such braking, a braking torque applied to the friction pads P and P' from the brake disk D is supported by that torque receiving surface 22 of the bracket B which is located at the downstream side of the direction of rotation of the brake disk D.

An urging force of the pistons 12, 12 and a reaction force thereto act to dilate the first and second arms $7_1$ and $7_2$ apart. But tensile and flexing stresses of the pairs of the first and second connecting bolts $16_1$, $16_1$; $16_2$, $16_2$ act to maintain the coupling of the first and second blocks $C_1$ and $C_2$ of the brake caliper against such dilating force.

As is apparent from the above-described expressions (1) and (2), the first connecting bolts $16_1$ have a tensile stress larger than that of the second connecting bolt $16_2$, but have a flexing stress smaller than that of the second connecting bolt $16_2$, because the distance from the first connecting bolt $16_1$ to the center 0 of the total urging force of the pistons 12, 12 is shorter than that from the second connecting bolt $16_2$ to the center 0. The allotment of the tensile and flexing stresses to the first and second connecting bolts $16_1$ and $16_2$ at different rates results in an equalization of stress and ultimately, the rigidity of the brake caliper C can effectively be increased by cooperation of the first and second connecting bolts $16_1$ and $16_2$. In addition, the slide pins 4 and the first and second connecting bolts $16_1$ and $16_2$ are arranged on a circle concentric with the brake disk D and hence, any of them are disposed as close to the brake disk D as possible. This enables the brake caliper C to be made compact.

In a maintenance, with the hanger pin 21 removed, the friction pads P and P' can immediately be withdrawn through the window opening 9 in the brake caliper C. Thus, it is possible to easily replace the friction pads P and P' with new ones without removing the brake caliper C from the bracket B.

Although the pair of pistons 12, 12 have been provided in the first arm 7₁ in the above embodiment, it will be understood that according to the present invention, one piston 12 or three or more pistons 12 may be provided.

What is claimed is:

1. A reaction force type disk brake comprising:
    a pair of friction pads disposed in an opposed relation to opposite faces of the brake disk;
    a brake caliper including first and second arms opposed to each other with the friction pads interposed therebetween, a bridge integrally interconnecting said arms, and a piston received in a hydraulic cylinder formed in said first arm for urging a back of one of said friction pads toward said second arm;
    a stationary bracket having a torque receiving surface portion on which opposite ends of each friction pad are carried; and
    a pair of slide pins connecting said brake caliper to said bracket for sliding movement in an axial direction of said brake disk, said bridge being provided with a window opening through which said friction pads can be inserted and withdrawn, said brake caliper being divided at said bridge into a first block closer to said first arm and a second block closer to said second arm, wherein
    said first and second blocks of said brake caliper are integrally interconnected by a pair of first connecting bolts and a pair of second connecting bolts arranged in a row on both sides of said window opening so as to extend through the bridge, all of said first and second connecting bolts being arranged along an outer peripheral surface of said brake disk, such that a relationship $L_1 < L_2$ is established wherein $L_1$ represents a distance between both said first connecting bolts and $L_2$ represents a distance between both said second connecting bolts and said pair of first connecting bolts and said pair of second connecting bolts are disposed on different sides of a line intersecting a radius line of said brake at right angles at a center of a total urging force of said piston, such that a relationship $H_1 < H_2$ is established wherein $H_1$ represents a distance from said line to said first connecting bolt and $H_2$ represents a distance from said line to said second connecting bolt.

2. A reaction force type disk brake according to claim 1, wherein said first and second connecting bolts are arranged on a circle concentric with said brake disk.

3. A reaction force type disk brake according to claim 1, wherein said slide pins are located inside the pair of first connecting bolts in a circumferential direction of the brake disk and radially outside a line connecting the first connecting bolts.

* * * * *